(12) United States Patent
Gaudreau, Jr. et al.

(10) Patent No.: US 11,318,867 B2
(45) Date of Patent: May 3, 2022

(54) CHILD CARRIER WITH SIDE IMPACT PROTECTION

(71) Applicant: MONAHAN PRODUCTS, LLC, Rockland, MA (US)

(72) Inventors: Paul Douglas Gaudreau, Jr., South Weymouth, MA (US); Carl J. Sukeforth, Milton, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 41 days.

(21) Appl. No.: 16/572,009

(22) Filed: Sep. 16, 2019

(65) Prior Publication Data

US 2021/0078464 A1   Mar. 18, 2021

(51) Int. Cl.
*B60N 2/28* (2006.01)

(52) U.S. Cl.
CPC ......... *B60N 2/2884* (2013.01); *B60N 2/2845* (2013.01); *B60N 2/2863* (2013.01); *B60N 2/2872* (2013.01)

(58) Field of Classification Search
CPC .. B60N 2/2884; B60N 2/2845; B60N 2/2863; B60N 2/2872
USPC .................................................... 297/216.11
See application file for complete search history.

(56) References Cited

U.S. PATENT DOCUMENTS

| | | | | |
|---|---|---|---|---|
| 7,959,223 | B2 * | 6/2011 | Marsden | ................... 297/216.11 |
| 8,038,209 | B2 * | 10/2011 | Marsden | .............. B60N 2/2872 297/216.11 |
| 9,174,555 | B2 * | 11/2015 | Rajasingham | |
| 2010/0295344 | A1 | 11/2010 | Marsden et al. | |
| 2010/0295347 | A1 | 11/2010 | Marsden et al. | |
| 2011/0047685 | A1 * | 3/2011 | Ferrara | .............................. 2/455 |
| 2017/0065098 | A1 | 3/2017 | Taylor et al. | |
| 2017/0151894 | A1 * | 6/2017 | McRoberts | .......... B60N 2/2884 |

FOREIGN PATENT DOCUMENTS

| | | |
|---|---|---|
| EP | 2368752 A2 | 9/2011 |
| EP | 2368753 A1 | 9/2011 |
| EP | 2570299 A1 | 3/2013 |
| WO | 2018109177 A1 | 6/2018 |

OTHER PUBLICATIONS

International Search Report and Written Opinion for corresponding International Application No. PCT/US2020/050843 dated Feb. 10, 2021.

* cited by examiner

*Primary Examiner* — Anthony D Barfield
(74) *Attorney, Agent, or Firm* — Lando & Anastasi, LLP

(57) ABSTRACT

A child conveyance device includes an impact energy absorbing apparatus disposed on a portion of the child conveyance device. The impact energy absorbing apparatus includes an inner support configured to be positioned against the portion of the child conveyance device. The inner support has a receptacle formed therein. The impact energy absorbing apparatus further includes an outer cover configured to releasably secure the inner support and an insert received within the receptacle of the inner support. The insert is held in place by the outer cover when securing the outer cover.

24 Claims, 15 Drawing Sheets

CHILD CARRIER WITH SIDE IMPACT PROTECTION

BACKGROUND

Aspects and embodiments of the present disclosure are directed generally to child conveyance devices, for example, car seats, and to an impact protection mechanism for same.

SUMMARY

One aspect of the present disclosure is directed to a child conveyance device comprising an impact energy absorbing apparatus disposed on a portion of the child conveyance device. In one embodiment, the impact energy absorbing apparatus includes an inner support configured to be positioned against the portion of the child conveyance device, the inner support having a receptacle formed therein, an outer cover configured to releasably secure the inner support, and an insert received within the receptacle of the inner support. The insert is held in place by the outer cover when securing the outer cover.

Embodiments of the child conveyance device further may include configuring the insert to have a wall with a closed end and an open end. The insert may be sized to fit within the receptacle of the inner support with the closed end first entering the receptacle. The receptacle of the inner support may have a shape complimentary to a shape of the insert. The insert may embody a rectangular-shaped frustum. The insert may be configured to partially enter the receptacle of the inner support, with an internal volume being defined between the internal surfaces of the inner support and the outer surfaces of the insert. When an impact force having an amplitude less than a threshold value is applied to the impact energy absorbing apparatus, the insert may be configured to resist the impact force, and when the impact force having an amplitude greater than the threshold value is applied to the impact energy absorbing apparatus, the insert may be configured to slide inwardly into the receptacle of the inner support to absorb the impact force, with the insert being configured to occupy the internal volume of the receptacle as the insert moves into the receptacle. The insert may be caused to plastically deform as the insert is moved within the receptacle. The inner support may be secured to a shell of the safety seat by the outer cover. The shell of the safety seat holds the outer periphery of the outer cover in place. The child conveyance device further may include an inner cover configured to fit within an opening formed in the outer cover, with the inner cover shielding the insert when assembled. The inner cover may be designed to fit within an opening formed in the outer cover. The child conveyance device may be a child vehicle safety seat. An impact force applied to the impact energy absorbing apparatus may have an amplitude less than a threshold value causes the insert to resist the impact force. An impact force applied to the impact energy absorbing apparatus may have an amplitude greater than the threshold value causes the insert to slide inwardly into the receptacle of the inner support to plastically deform the insert. The impact energy absorbing apparatus may be replaceably secured to the portion of the child conveyance device. The inner support may be fabricated from foam material and the outer cover is fabricated from plastic material.

Another aspect of the present disclosure is directed to an impact energy absorbing apparatus disposed on a portion of a child conveyance device. In one embodiment, the impact energy absorbing apparatus includes an inner support configured to be secured to the portion of the child conveyance device, the inner support having a receptacle formed therein, an outer cover configured to releasably secure the inner support, and an insert received within the receptacle of the inner support. The insert being is held in place by the outer cover when securing the outer cover.

Embodiments of the impact energy absorbing apparatus further may include configuring the insert to have a wall with a closed end and an open end. The insert may be sized to fit within the receptacle of the inner support with the closed end first entering the receptacle. The receptacle of the inner support may have a shape complimentary to a shape of the insert. The insert may embody a rectangular-shaped frustum. The insert may be configured to partially enter the receptacle of the inner support, with an internal volume being defined between the internal surfaces of the inner support and the outer surfaces of the insert. When an impact force having an amplitude less than a threshold value is applied to the impact energy absorbing apparatus, the insert may be configured to resist the impact force, and when the impact force having an amplitude greater than the threshold value is applied to the impact energy absorbing apparatus, the insert may be configured to slide inwardly into the receptacle of the inner support to absorb the impact force, with the insert being configured to occupy the internal volume of the receptacle as the insert moves into the receptacle. The insert may be caused to plastically deform as the insert is moved within the receptacle. The impact energy absorbing apparatus further may include an inner cover configured to fit within an opening formed in the outer cover, the inner cover shielding the insert when assembled. The inner cover may be designed to fit within an opening formed in the outer cover. The inner support may be fabricated from foam material and the outer cover is fabricated from plastic material.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
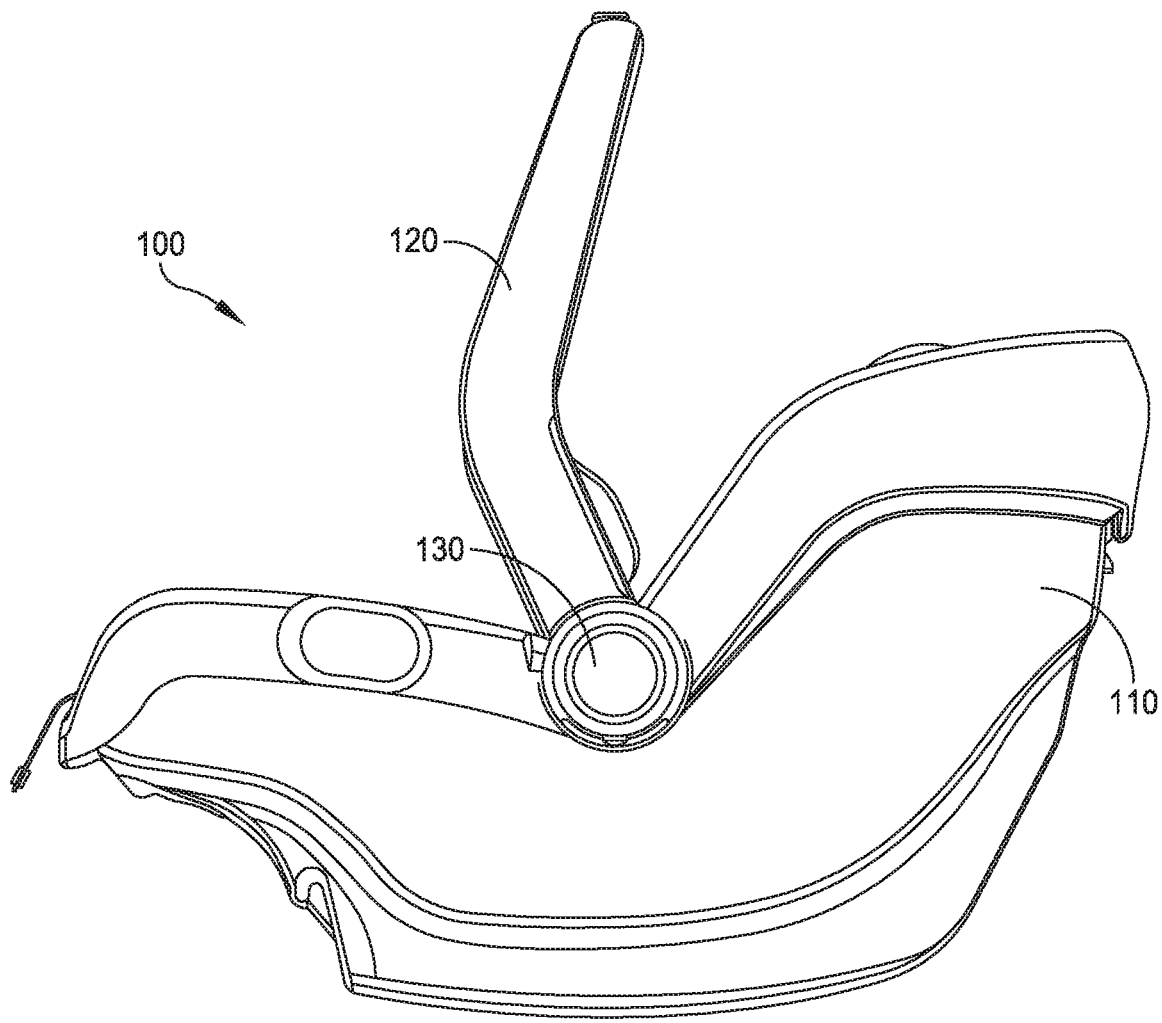
FIG. 1 is an elevational view from the side of a child vehicle safety seat.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Conventional seat belt systems in most motor vehicles are typically not appropriate for properly restraining infants or small children. Accordingly, parents or caregivers of infants or small children often transport the infants or small children in a child carrier commonly referred as a car seat or child vehicle safety seat when travelling in a motor vehicle, the use of which is required by law for children below a certain age in many jurisdictions. The car seat may be secured to the back seat of a motor vehicle with a seat belt, for example, a three-point safety belt and/or other connectors such as Isofix connectors. The car seat may be padded with different forms of energy absorbing materials, which may reduce forces that a child riding in the car seat may be exposed to during a motor vehicle collision. Conventional child vehicle safety seats have proven highly effective in reducing injuries to children which may otherwise have been sustained as a result of a motor vehicle collision. It has been recognized, however, that the side impact protection offered by many conventional child vehicle safety seats may be inadequate or at least may be improved upon. Regulations setting forth standards for side impact protection in child vehicle safety seats have recently been enacted in Europe and similar regulations are expected to be enacted in the United States of America. Provision of adequate levels of side impact protection in child vehicle safety seats to meet such regulations has thus become of increasing importance.

Aspects and embodiments disclosed herein include apparatus that may be coupled to conventional child vehicle safety seats and modifications to conventional child vehicle safety seats that may improve the side impact protection offered by the child vehicle safety seats. Some aspects and embodiments disclosed herein include an energy absorbing apparatus that may be mechanically coupled or formed integral with a portion of a side of a child vehicle safety seat and that may reduce side impact forces that a child occupying the child vehicle safety seat may be exposed to during a motor vehicle collision. Some embodiments of the apparatus may include a pair of interlocking shell elements and an energy absorbing material disposed within a cavity defined by the interlocking shell elements. The interlocking shell elements may be free to move relative to one another, for example, for one of the shell elements to slide into the other shell element, to reduce the size of the internal cavity upon application of an external force. Reduction of the size of the internal cavity may cause the energy absorbing material to mechanically compress and/or plastically deform or rupture and absorb forces which otherwise might be transferred to a child occupying the child vehicle safety seat. The energy absorbing apparatus may be reusable or, in some embodiments, may provide an indication that it should be replaced after absorbing a sufficiently high amount of energy.

One embodiment of a child vehicle safety seat is illustrated in elevational view from the side generally at 100 in FIG. 1. The child vehicle safety seat 100 may be a stand-alone device or may be configured to be secured to, for example, a stroller frame or to a separate car seat base by the provision of appropriate securing mechanisms as are known in the art on, for example, a lower surface of the seat. The child vehicle safety seat 100 includes a shell 110 and a carrying handle 120 pivotally attached to the shell 110 at handle pivot mechanisms 130 which may be positioned on an outer surface of either or both sides of the shell 110. The handle 120 is generally U-shaped, and may be pivoted into a position extending generally vertically upward from the pivot mechanism(s), into a position against a surface of the shell 110, or into one or more intermediate positions. The shape, form, and method of connection of the handle 120 to the shell 110 is not, however, limited to that illustrated. Other handles having different shapes, orientations, or methods of connection to the shell of a child vehicle safety seat 100 may be utilized in various embodiments.

Figure 2:
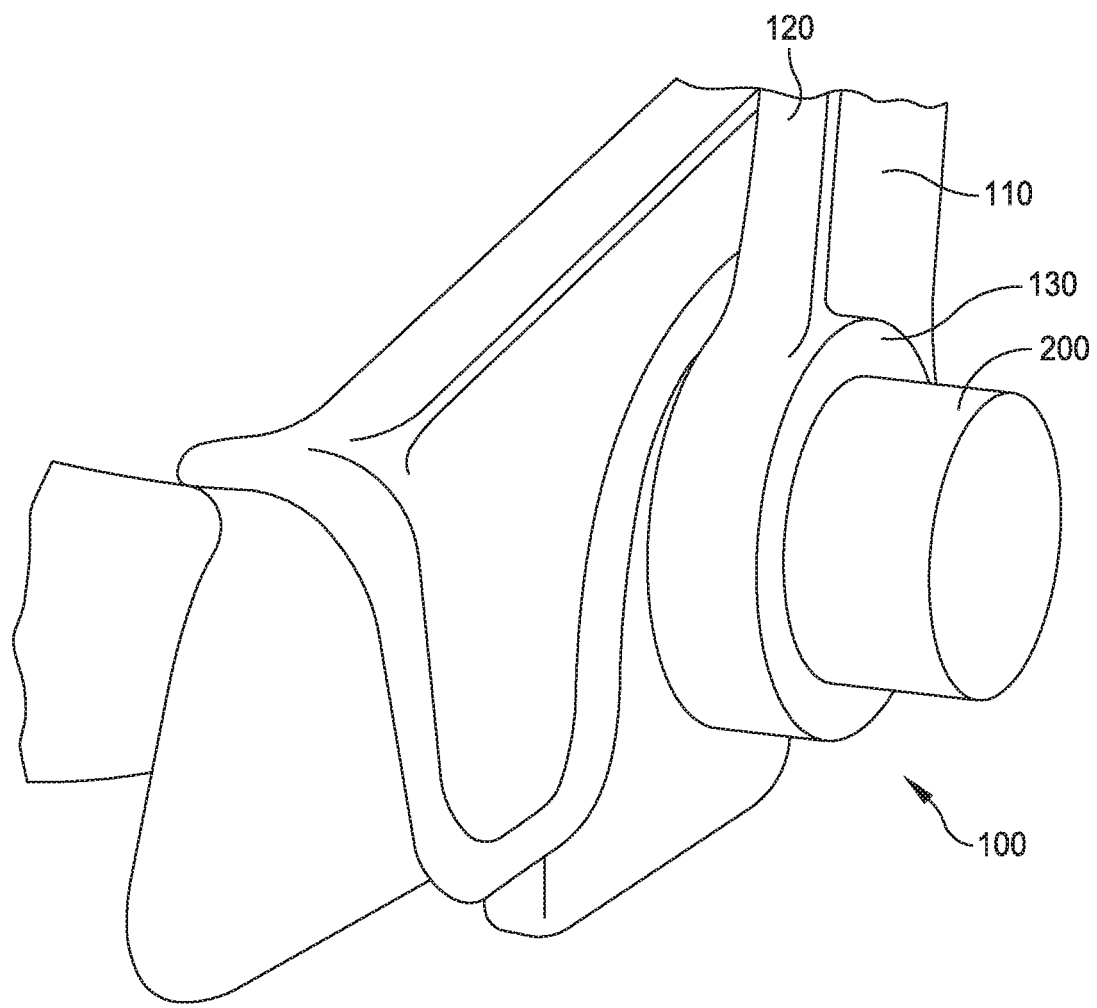
FIG. 2 is a perspective view of a portion of a child vehicle safety seat including a side impact energy absorbing apparatus.

In some embodiments of a child vehicle safety seat 100 the handle pivot mechanisms 130 may be positioned at locations more lateral than many, if not all, other portions of the child vehicle safety seat 100. Accordingly, the handle pivot mechanisms 130 may provide surfaces upon which it may be desirable to dispose embodiments of a side impact energy absorbing apparatus. FIG. 2 illustrates a generalized embodiment of a side impact energy absorbing apparatus 200 coupled to an outside surface of a handle pivot mechanism 130 of an embodiment of a child vehicle safety seat 100, only a portion of which is illustrated in FIG. 2 for clarity.

Figure 3:
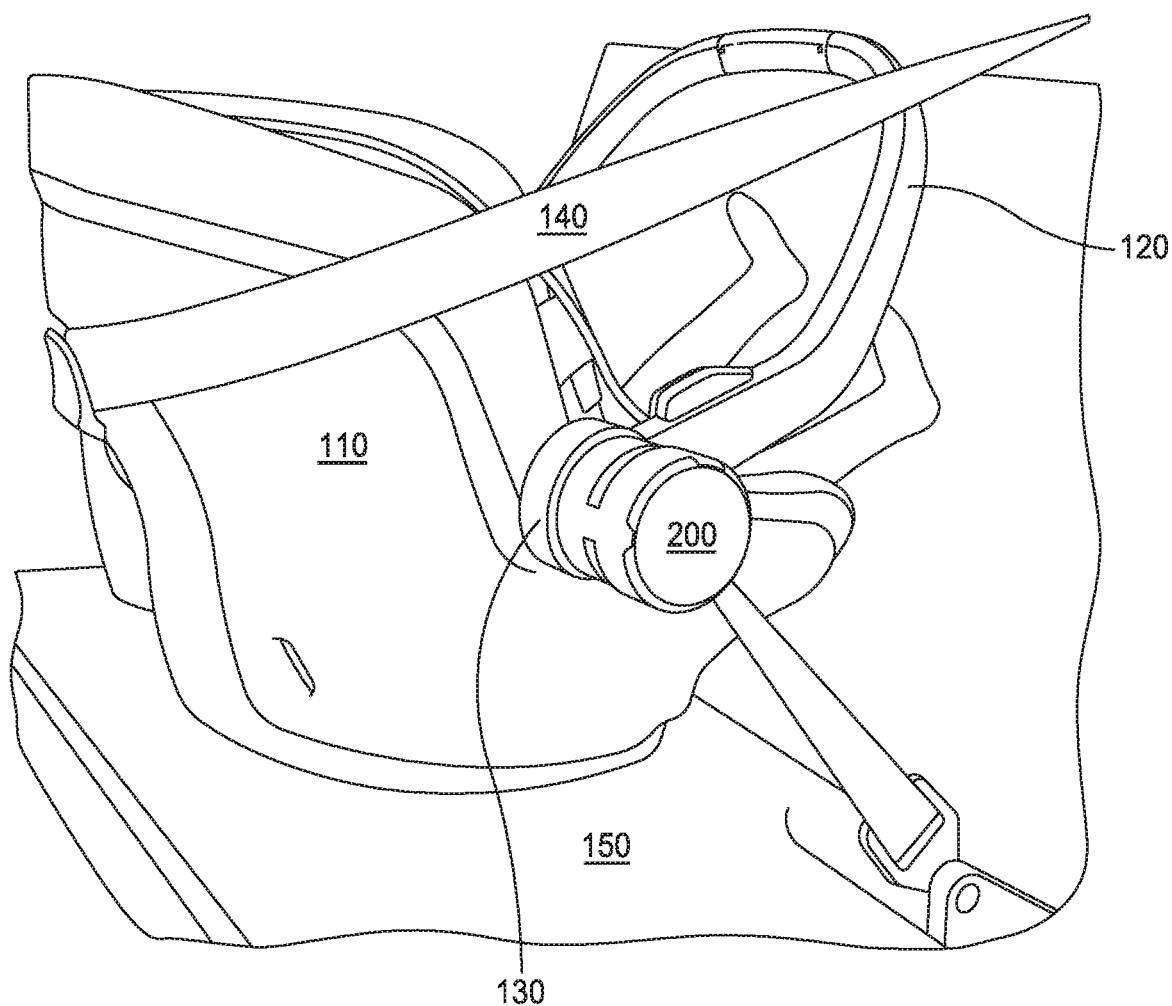
FIG. 3 is a perspective view of a child vehicle safety seat including a side impact energy absorbing apparatus mounted to a car seat.
Figure 4:
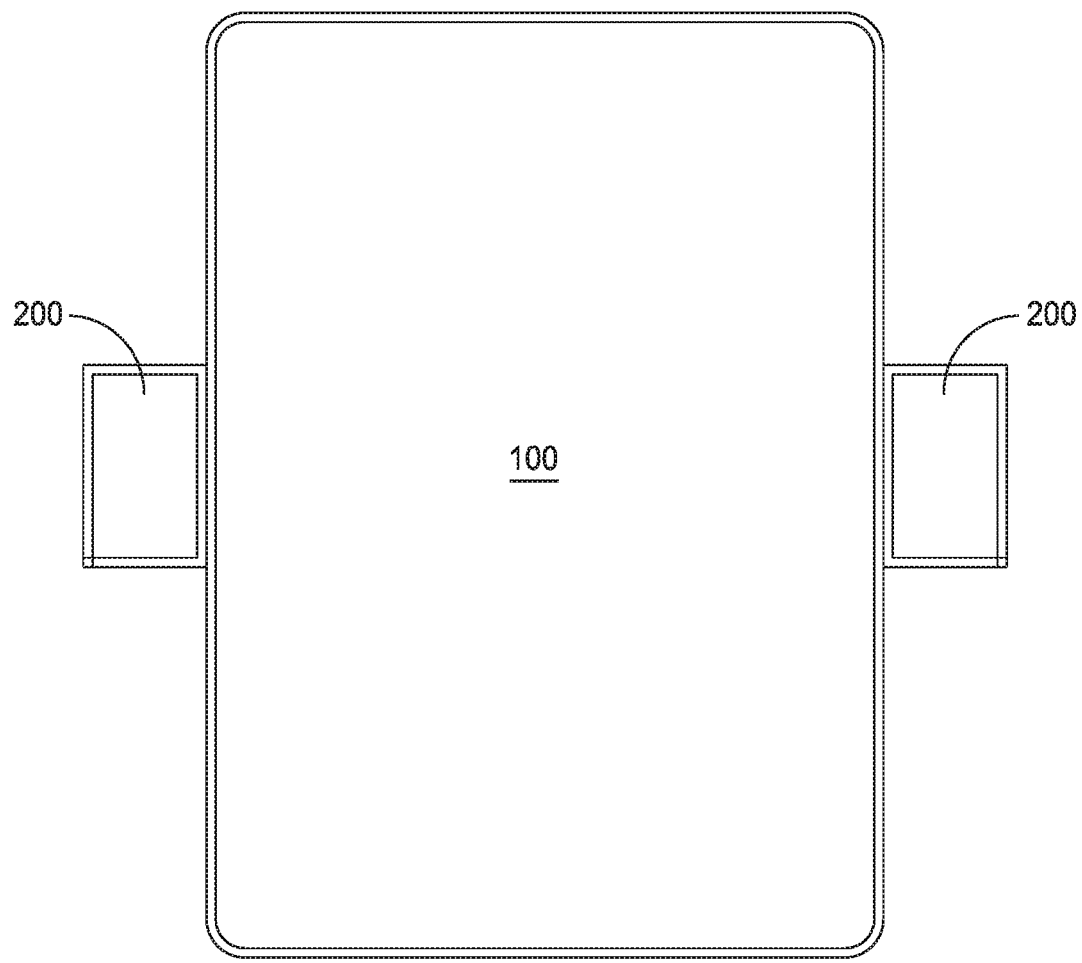
FIG. 4 is a simplified plan view of an embodiment of a child vehicle safety seat including side impact energy absorbing apparatus on both the left and right sides.

Another embodiment of a side impact energy absorbing apparatus 200 is illustrated coupled to the handle pivot mechanism 130 of another embodiment of a child vehicle safety seat 100 in FIG. 3. The positions and coupling of seatbelt straps 140 that may be used to secure the child vehicle safety seat 100 to a motor vehicle seat 150 is also illustrated in FIG. 3. In some embodiments, a side impact energy absorbing apparatus 200 is provided on both lateral sides of a child vehicle safety seat 100, for example, as illustrated in FIG. 4 in which the child vehicle safety seat 100 is illustrated in a highly simplified manner. In embodiments in which only a single side impact energy absorbing apparatus 200 is provided on a child vehicle safety seat 100, the child vehicle safety seat 100 should be positioned such that the side impact energy absorbing apparatus 200 faces a surface of the motor vehicle, for example, a door of the motor vehicle, that the child vehicle safety seat 100 is most likely to come into contact with upon the motor vehicle experiencing a side impact collision.

Figure 5A:
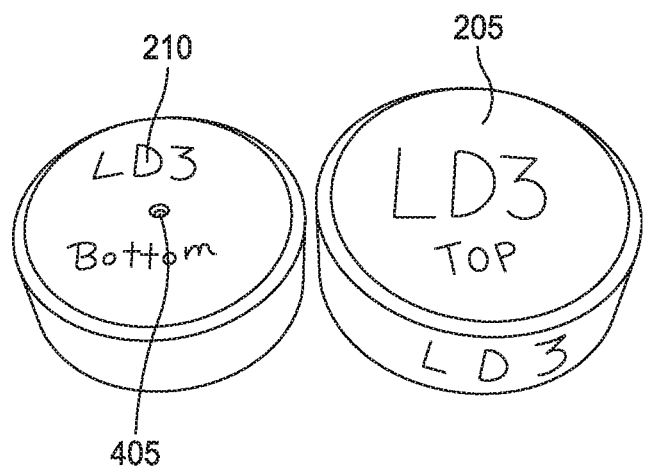
FIG. 5A illustrates external portions of an embodiment of a side impact energy absorbing apparatus.
Figure 5B:
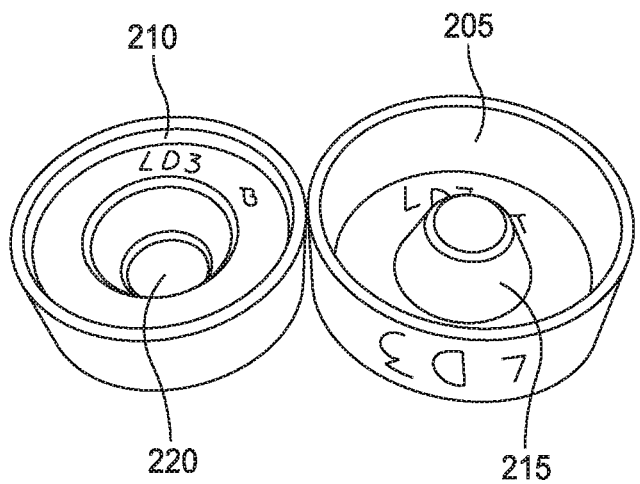
FIG. 5B illustrates internal portions of an embodiment of a side impact energy absorbing apparatus.

In some embodiments, the side impact energy absorbing apparatus 200 includes a pair of outer shells, an upper shell 205 and a lower shell 210. As used herein, the lower shell 210 shall be considered the shell that contacts and is disposed on embodiments of a child vehicle safety seat 100. The outer periphery of one of the upper shell 205 or the lower shell 210 may be sized and shaped to fit within an internal perimeter of the other of the upper shell 205 or the lower shell 210. The one of the upper shell 205 or the lower shell 210 may have an outer surface sized and shaped to slideably engage the internal surface of the other of the upper shell 205 or the lower shell 210 such that the one of the upper shell 205 or the lower shell 210 may slide into or out from an internal volume of the other of the upper shell 205 or the lower shell 210. Outer surfaces of one embodiment of a pair of upper and lower shells 205, 210 is illustrated in FIG. 5A. Inner surfaces of one embodiment of a pair of upper and lower shells 205, 210 is illustrated in FIG. 5B. The upper and lower shells 205, 210 may have internal features such as an internally projecting frustoconical projection 215 in the upper shell 205 and a recess 220 in the lower shell 210. The recess 220 in the lower shell 210 may have a shape complimentary to the frustoconical projection 215. The internal features of the upper and lower shells 205, 210 should not be considered limited to having the shapes illustrated in FIG. 5B. In other embodiments the projection 215 may have an alternative shape, for example, that of a rectangle, a hemisphere or portion thereof, or a flat topped pyramid or square frustum and the recess 220 may have a complimentary shape.

Figure 6A:
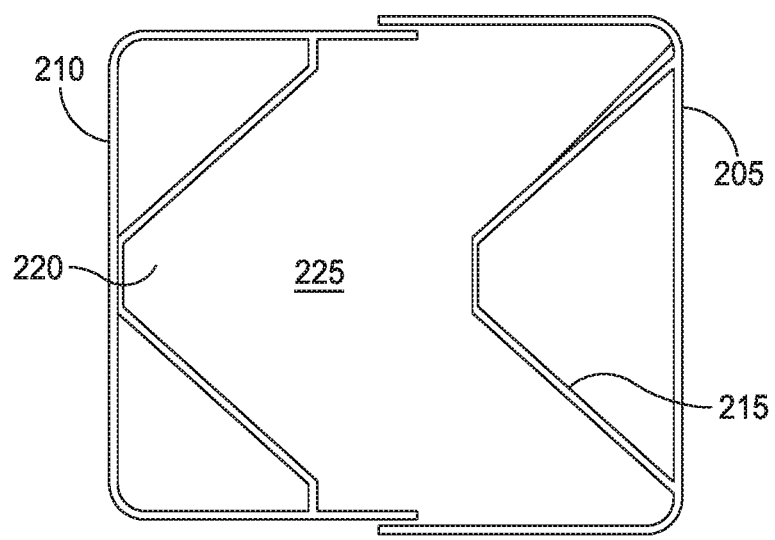
FIG. 6A is a cross-sectional view of assembled portions of an embodiment of a side impact energy absorbing apparatus.
Figure 6B:
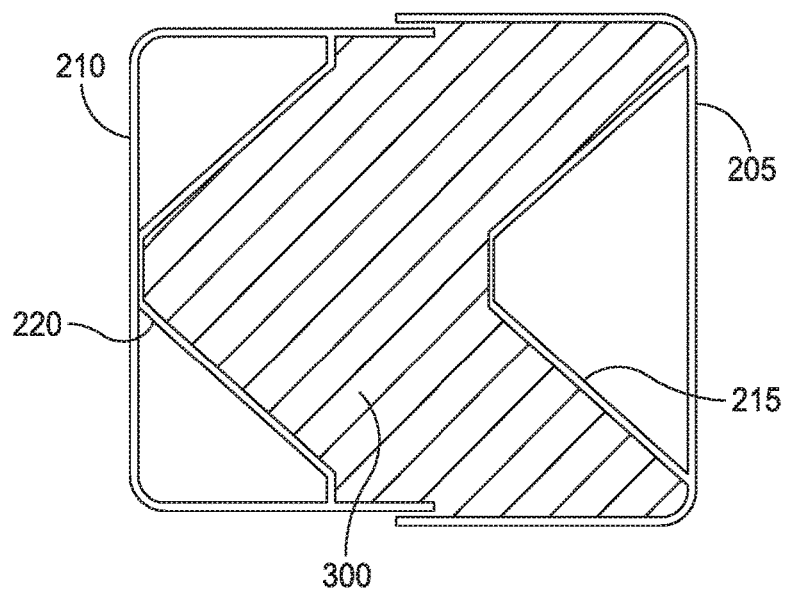
FIG. 6B is a cross-sectional view of assembled portions of an embodiment of a side impact energy absorbing apparatus including an internal volume housing a resilient material.
Figure 7:
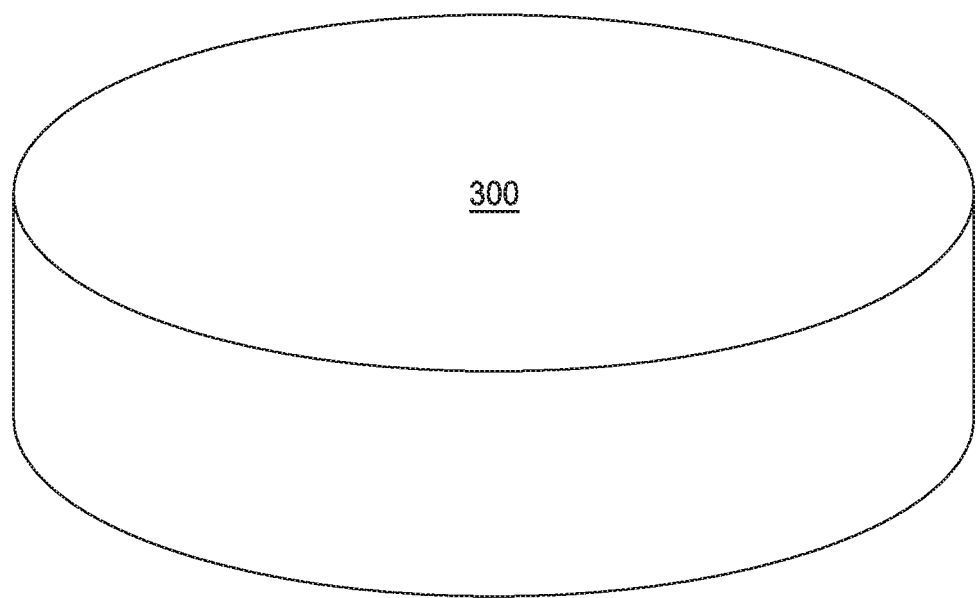
FIG. 7 illustrates a disc of resilient material that may be utilized with embodiments of a side impact energy absorbing apparatus.

The lower shell 210 may have a diameter that provides for the lower shell 210 to be at least partially inserted into the upper shell 205, for example, as illustrated in FIG. 6A. An internal volume 225 is defined between the internal surfaces of the upper shell 205 and the lower shell when the lower shell 210 is at least partially inserted into the upper shell 205. This internal volume 225 may be at least partially, or substantially completely, filled with a resilient material 300, for example, a foam material or a memory foam material, as illustrated in FIG. 6B. The resilient material 300 may be provided in the form of a disc as illustrated in FIG. 7 and may deform to conform to the shape of the internal volume 225 when the upper and lower shells 205, 201 are joined around the resilient material. The resilient material 300 may be a polyurethane memory foam or any other suitable polymeric foam material.

Figure 6C:
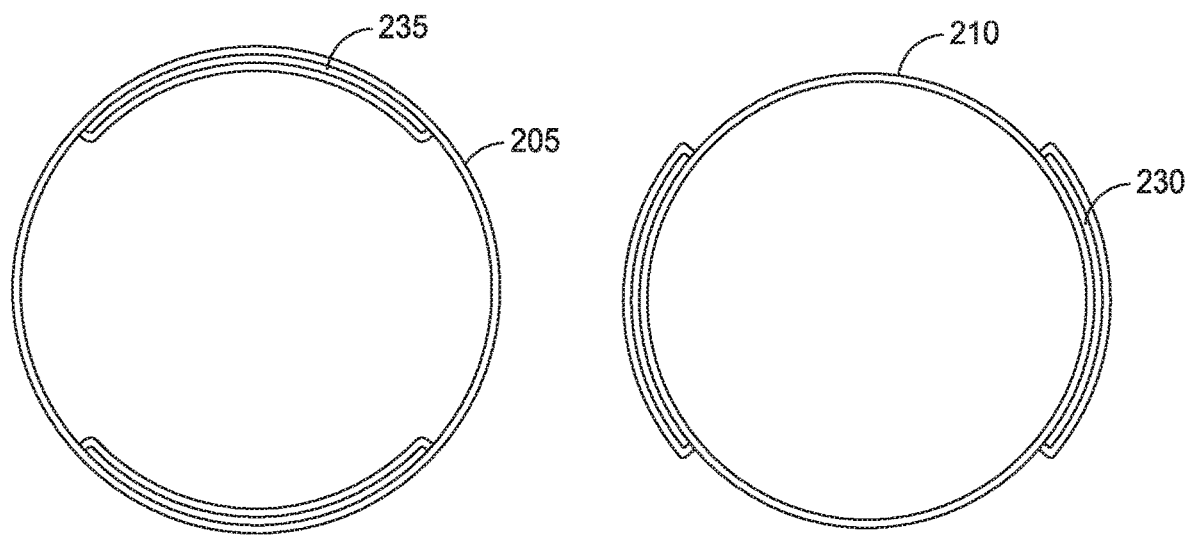
FIG. 6C illustrates an embodiment of an attachment mechanism for portions of an embodiment of a side impact energy absorbing apparatus.
Figure 6D:
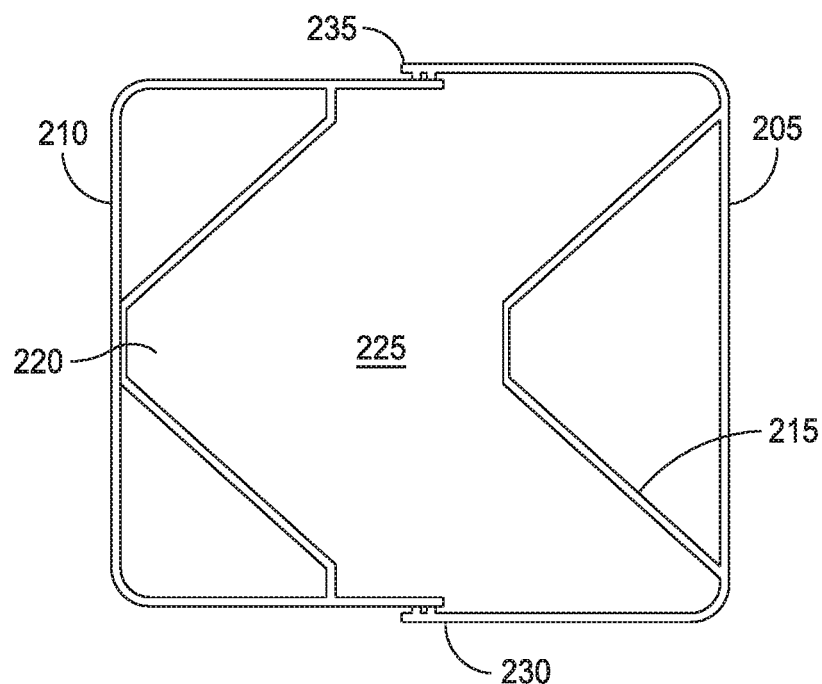
FIG. 6D illustrates another embodiment of an attachment mechanism for portions of an embodiment of a side impact energy absorbing apparatus.
Figure 6E:
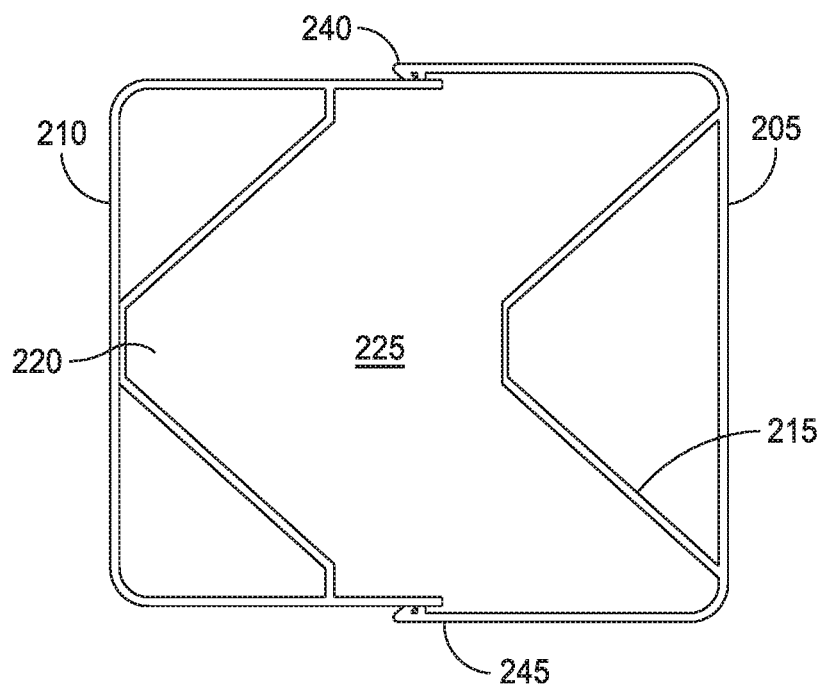
FIG. 6E illustrates another embodiment of an attachment mechanism for portions of an embodiment of a side impact energy absorbing apparatus.

One or more features may provide for the lower shell 210 to be retained within the upper shell 205. The upper and lower shells 205, 210 may include, for example, bayonet mounts or a ridge or ridges 230 in the lower shell 210 that fit or that can be rotated into position below a complimentary ridge or ridges 235 in the upper shell 205 as illustrated in FIGS. 6C and 6D. Alternatively or additionally a clip or clips 240 and complimentary landing ridge or ridges 245 may be provided on the upper and lower shells 205, 210, for example, as illustrated in FIG. 6E.

The upper and lower shells 205, 210 may be formed from a stiff material, for example, polypropylene or another engineering plastic and may have diameters or widths of about two inches (about five cm) and heights of about two inches (about five cm), although these materials and dimensions should be considered non-limiting examples only.

In the figures referenced above, the shell having the lesser diameter is designated as the lower shell 210 and the shell having the greater diameter is illustrated as the upper shell 205, however, it should be appreciated that in other embodiments, the lower shell 210 may have a greater diameter or cross-sectional area than the upper shell 205. Further, the shells should not be considered limited to being cylindrical. In other embodiments, the shells may have alternative cross sections, for example, triangular cross sections or rectangular cross sections. Additionally, in some embodiments, the shell with the lesser diameter or cross sectional area may include an internal protrusion such as the frustoconical projection 215 and the shell with the greater diameter or cross sectional area may include a recess, such as the recess 220 illustrated in FIG. 5B.

Figure 8A:
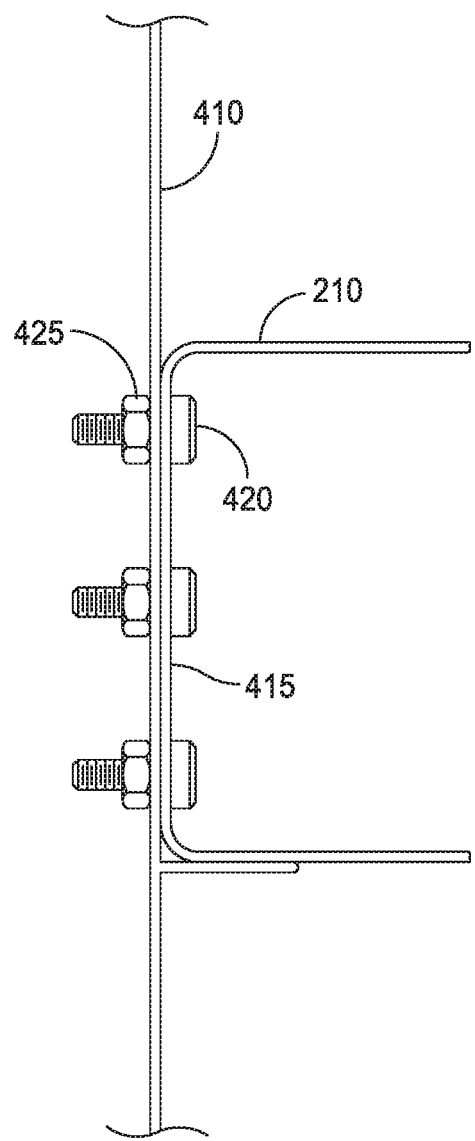
FIG. 8A illustrates a mechanism for attaching a side impact energy absorbing apparatus to a wall of a child vehicle safety seat.
Figure 8B:
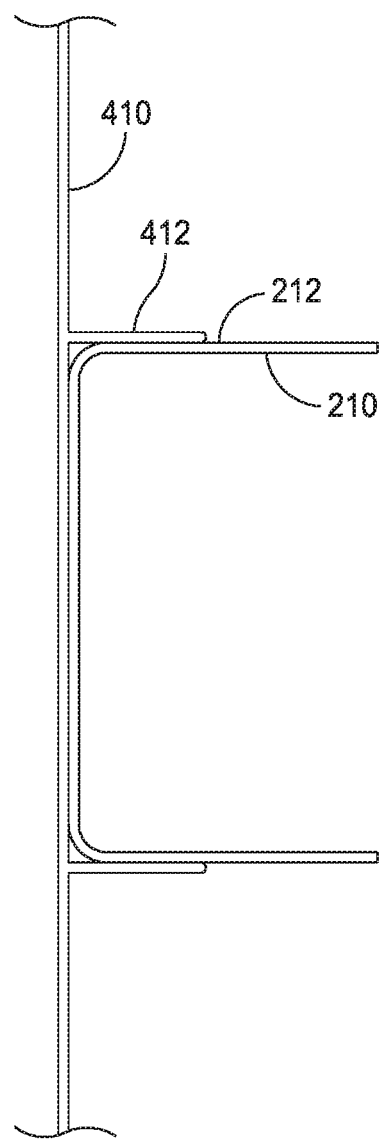
FIG. 8B illustrates another mechanism for attaching a side impact energy absorbing apparatus to a wall of a child vehicle safety seat.

The lower shell 210 may be mechanically coupled to a portion of a side of the child vehicle safety seat 100, for example, to a wall 410 of a handle pivot mechanism 130 of the child vehicle safety seat 100. On or more apertures 405 may be provided in a lower wall of the lower shell 210, one of which is illustrated in FIGS. 5A and 5B, through which a fastener, for example, a screw or bolt may pass to engage with and couple the lower shell 210 to the wall 410 of the child vehicle safety seat 100. FIG. 8A illustrates an embodiment of the lower shell 210 (internal features omitted for clarity) secured to a wall 410 of a child vehicle safety seat 100 by multiple bolts 420 passing through the lower wall 415 of the lower shell 210 and through the wall 410 of the child vehicle safety seat 100 and secured by nuts 425 on the opposite side of the wall 410 as the lower shell 210. FIG. 8B illustrates an embodiment in which a portion of the outer wall 212 of the lower shell 210 is threaded and engages internal threads of a receptacle 412 extending from the wall 410 so that the lower shell 210 may screwed into the receptacle 412 and be retained against the wall 410. In other embodiments, the lower shell 210 may be secured to the wall 410 of a child vehicle safety seat 100 either fixedly or removably by other fastening mechanisms known in the art, for example, an adhesive, one or more clips, a bayonet mount, hook and loop fasteners, etc. Any one or more of the above referenced fastening mechanisms may be utilized alone or in combination. The upper shell 205 may be mounted on the side of the lower shell 210 not secured to the wall 410 in a manner as described above.

In use, if an impact force is applied to the upper shell 205 of the side impact energy absorbing apparatus 200, the upper shell 205 is pushed inward into the lower shell 210. The internal volume 225 between the upper and lower shells 205, 210 is reduced, and the resilient material 300 within the internal volume 225 is compressed. Initially, the resilient material 300 is elastically deformed and absorbs impact energy at a first rate, e.g., the upper shell 205 is pushed inward toward the lower shell 210 at a first rate or distance per unit force. As additional force or impact energy is applied to the upper shell 205 of the side impact energy absorbing apparatus 200 the resilient material 300 is squeezed between the internal features of the upper and lower shells 205, 210, for example, the projection 215 and recess 220 to a degree that it begins to plastically deform or tear. This additional mechanism of deformation of the resilient material 300 causes the upper shell 205 to be pushed inward toward the lower shell 210 at a second rate or distance per unit force, which may be less than the first rate or distance per unit force and may absorb more impact energy than the elastic deformation of the resilient material 300. In some embodiments, the additional mechanism of deformation of the resilient material 300 may begin after the upper and lower shells 205, 210 are pushed together more than about 50% of the distance of separation in their resting uncompressed state.

The side impact energy absorbing apparatus 200 may in some embodiments be reusable after absorbing impact energy. For example, if the absorbed impact energy is not sufficient to plastically deform the resilient material 300, the resilient material 300 may return to its initial, pre-impact shape. In other embodiments, the energy absorbing apparatus 200 should be replaced after being subjected to a sufficiently high impact force. For example, if an impact force causes the resilient material 300 to plastically deform a user may observe that the upper and lower shells 205, 210 do not return to their initial pre-impact configuration, which may provide an indication that the side impact energy absorbing apparatus 200, or perhaps only the resilient material 300, should be replaced. The fasteners or fastening mechanisms that hold the upper and lower shells 205, 210 together, and/or the fasteners or fastening mechanisms that hold the lower shell 210 to a wall of the child vehicle safety seat 100 may be releasable such that the upper and lower shells 205, 210 may be separated and the resilient material 300 replaced as needed or the side impact energy absorbing apparatus 200 may be removed and replaced as needed.

Figure 9:
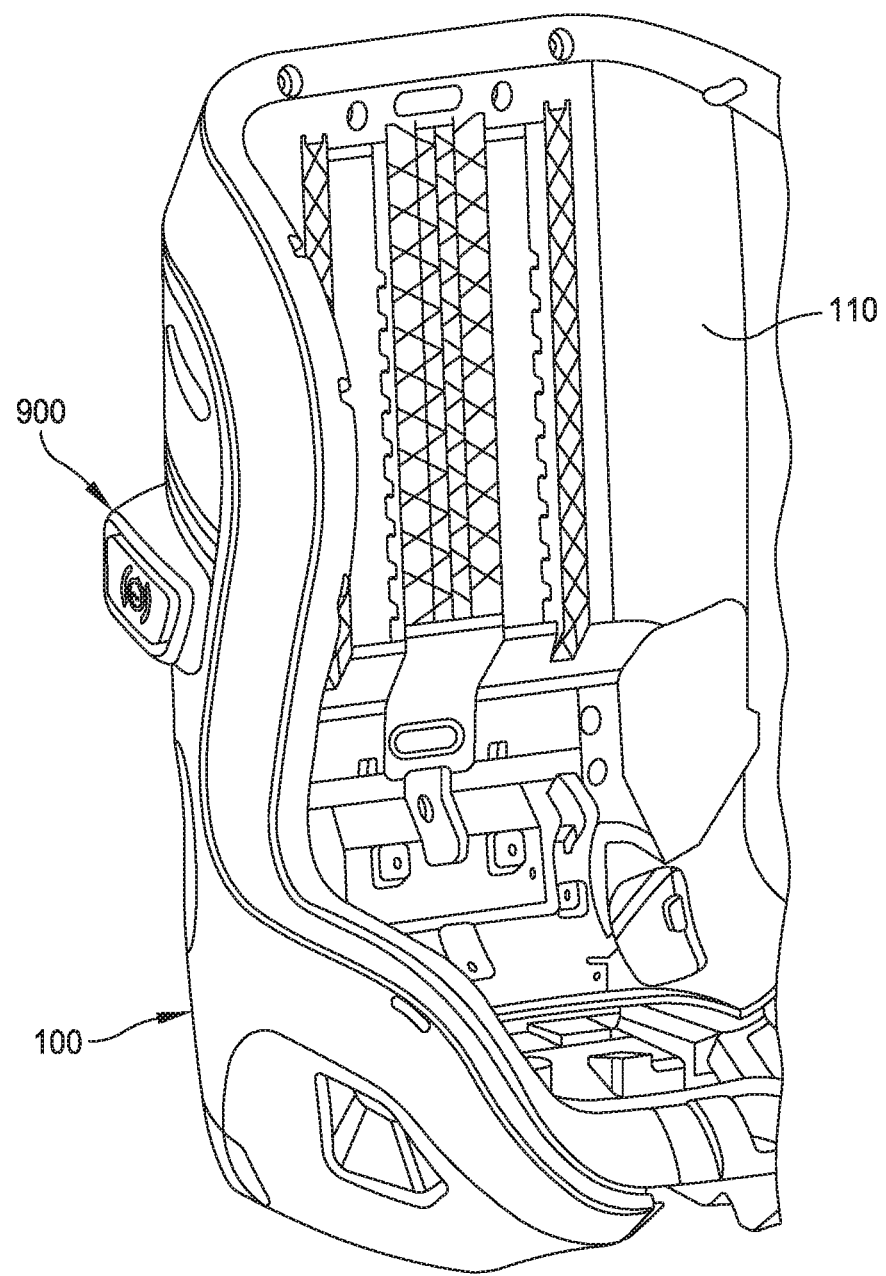
FIG. 9 is a perspective view of a portion of a child vehicle safety seat having a side impact energy absorbing apparatus of another embodiment of the disclosure.

Referring to FIG. 9, another embodiment of a side impact energy absorbing apparatus is generally indicated at 900. In some embodiments, the side impact energy absorbing apparatus 900 is provided on both lateral sides of a child vehicle safety seat 100. In embodiments in which only a single side impact energy absorbing apparatus 900 is provided on the child vehicle safety seat 100, the child vehicle safety seat 100 should be positioned such that the side impact energy absorbing apparatus 900 faces a surface of the motor vehicle, for example, a door of the motor vehicle, that the child vehicle safety seat 100 is most likely to come into contact with upon the motor vehicle experiencing a side impact collision.

Figure 10:
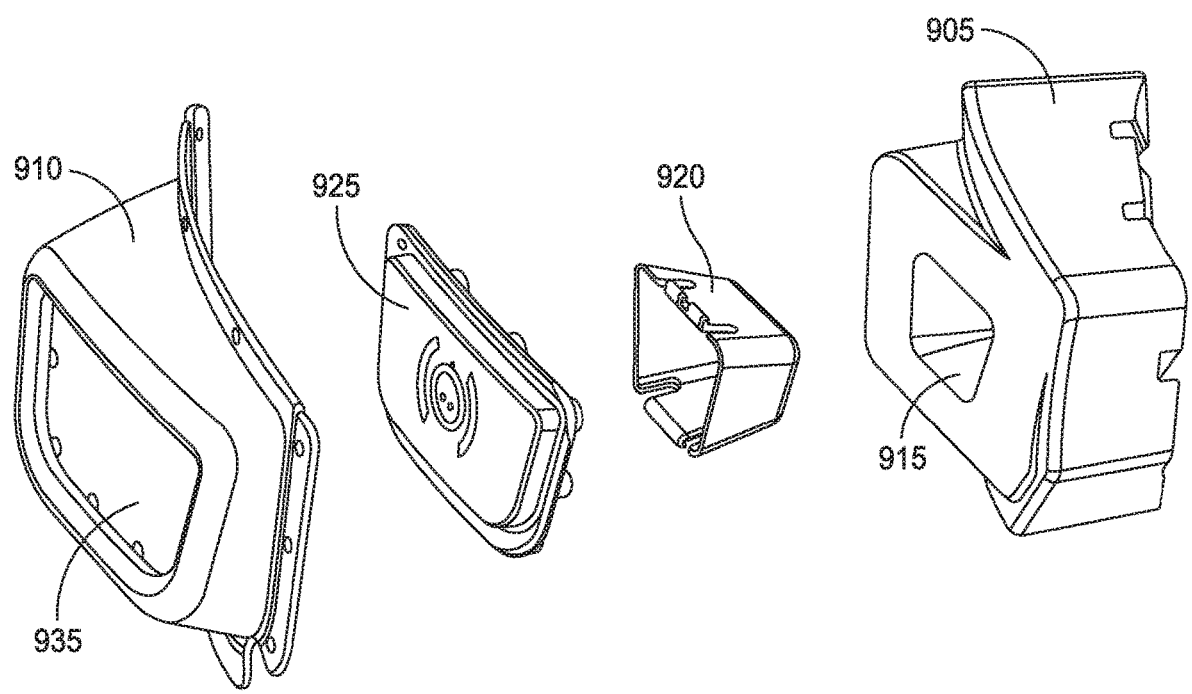
FIG. 10 is an exploded perspective view of the side impact energy absorbing apparatus shown in FIG. 9.

Referring to FIG. 10, in some embodiments, the side impact energy absorbing apparatus 900 includes a foam inner support 905 and a rubber outer cover 910 that fits over the inner support. In one embodiment, the inner support 905 is held in place or otherwise secured on a side of the shell 110 of the child vehicle safety seat 100. The inner support 905 may be sized and formed to fit within a receptacle of the shell 110 of the safety seat 100. In one embodiment, the inner support 905 is secured to the shell 110 of the safety seat 100 by the outer cover 910. As shown, the inner support 905 includes a receptacle 915 formed therein, the purpose of which will be described below.

The side impact energy absorbing apparatus 900 further includes a plastic insert 920 that is received within the receptacle 915 of the inner support 905 and a plastic inner cover 925 that is secured in place between the inner support and the outer cover 910 when the outer cover is secured to the inner support. As shown, the insert 920 has a relatively thin wall with a closed end and an open end, and is sized to fit within the receptacle 915 of the inner support 905 with the closed end first entering the receptacle. In one embodiment, the receptacle 915 of the inner support 905 may have a shape complimentary to the rectangular-shaped frustum insert 920. In other embodiments, the insert 920 may have an alternative shape, for example, that of a conical, a hemisphere or portion thereof, or a flat-topped pyramid or square frustum and the receptacle 915 may have a complimentary shape.

To assemble the side impact energy absorbing apparatus 900, the inner support 905 is held in place by the shell 110 and surrounding seat side foam of the safety seat 100. In other embodiments, the inner support 905 can be held in place by glue, rivets, tape, or the like. The insert 920 is received within the receptacle 915 of the inner support with the inner cover 925 being placed over the open end of the insert. The outer cover 910 is placed over the inner cover 925, and, in one embodiment, is secured to the inner cover 925, for example, by a snap-fit connection associated with respective peripheries of the inner cover 925 and the outer cover 910 and/or the shell 110 of the safety seat 100. In a certain embodiment, the shell 110 of the safety seat 100 holds the outer periphery of the outer cover 910 in place. In other embodiments, the outer cover 910 may be secured to the inner support 905 and/or the shell 110 of the safety seat 100 by mechanical fasteners.

Thus, it should be observed that the inner support 905 floats unattached to the shell 110 and/or the other components of the side impact energy absorbing apparatus 900, but is held in place. In one embodiment, slots formed on the back of the inner support 905 are provided to clear ribs formed in the shell 110 so that the inner support 905 can engage a larger surface of the shell 110. The ribs also prevent relative movement of the inner support 905 and the shell 110. In some embodiments, the outer cover 910 is secured to the shell by any suitable method, such as heat staking of molded-in posts provided on the shell over holes formed in a flange of the outer cover.

Figure 11:
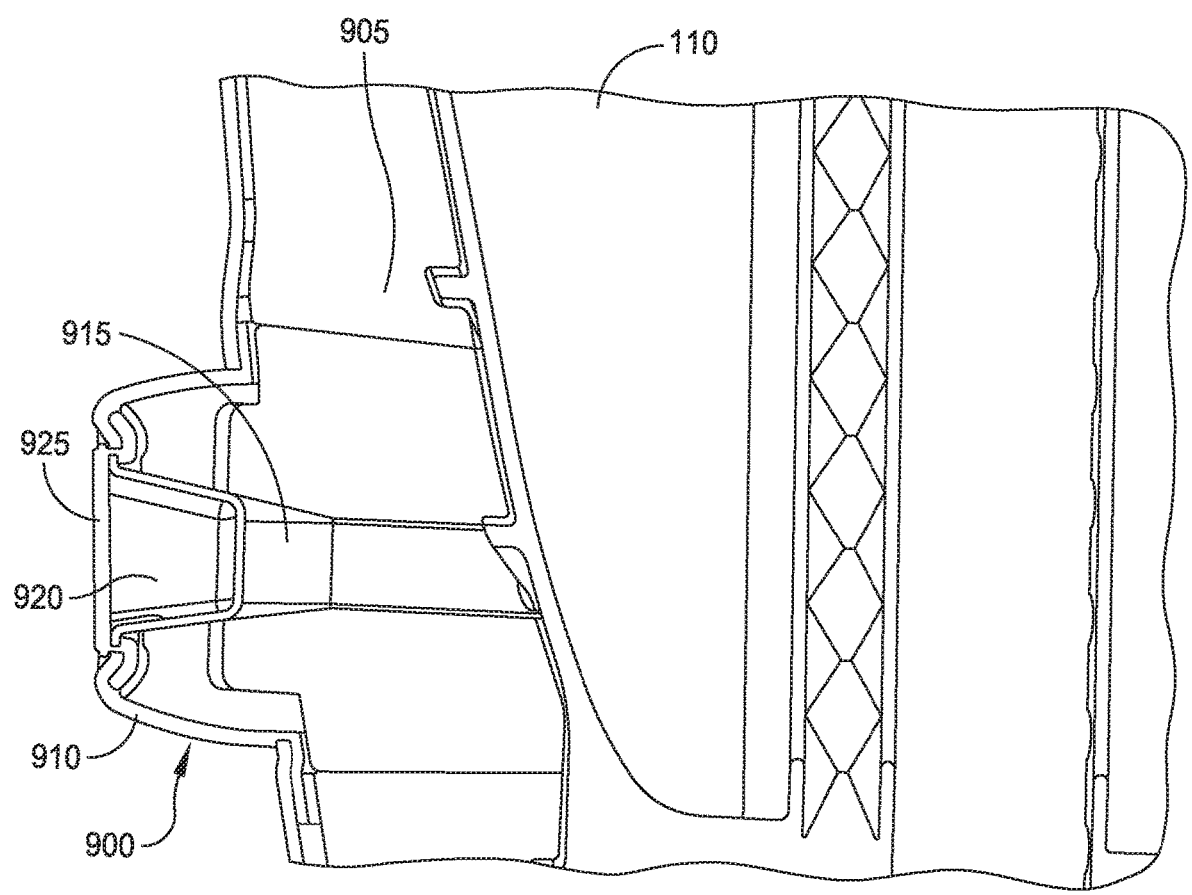
FIG. 11 is a cross-sectional view of the side impact energy absorbing apparatus shown in FIG. 9.
Figure 12:
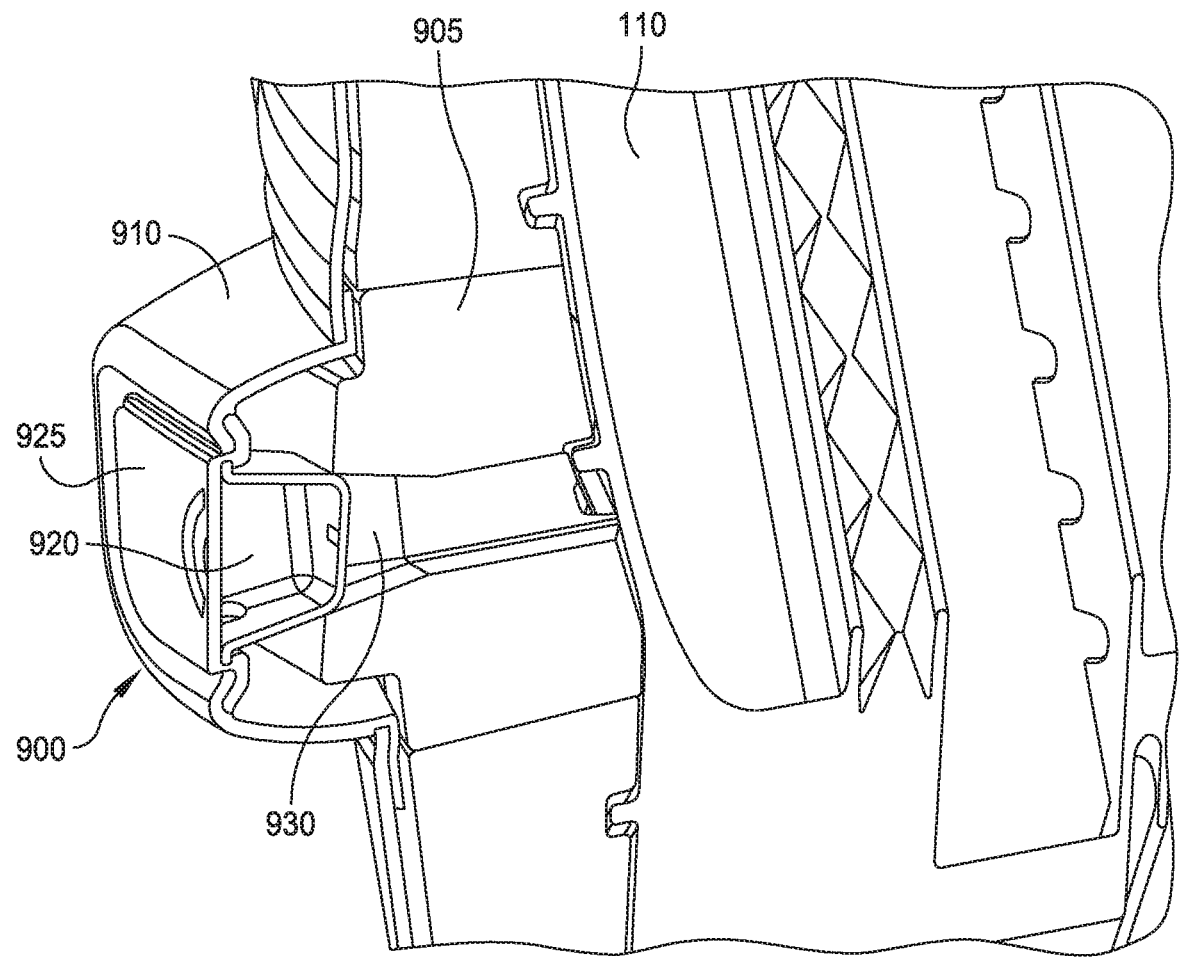
FIG. 12 is another cross-sectional view of the side impact energy absorbing apparatus shown in FIG. 9.

Referring to FIGS. 11 and 12, the insert 920 is configured to partially enter the receptacle 915 of the inner support 905. An internal volume 930 (FIG. 12) is defined between the internal surfaces of the inner support 905 and the outer surfaces of the insert 920. In some embodiments, the internal volume 930 may be an open space. In other embodiments, the internal volume may be at least partially, or substantially completely, filled with a resilient material, for example, a foam material or a memory foam material. The resilient material may be a polyurethane memory foam or any other suitable polymeric foam material.

The arrangement is such that an impact force applied to the impact energy absorbing apparatus 900 having an amplitude of less than a threshold value causes the insert 920 to resist the impact force. However, if the impact force applied to the impact energy absorbing apparatus 900 has an amplitude of greater than the threshold value, the insert 920 is configured to slide inwardly into the receptacle 915 of the inner support 905 to absorb the impact force. The insert 920 is configured to occupy the internal volume 930 of the receptacle 915 as the insert 920 moves into the receptacle 915. In some embodiments, the insert 920 is caused to plastically deform as the insert is moved within the receptacle 915.

The inner cover 925 is designed to fit within an opening 935 formed in the outer cover 910. As shown, the inner cover 925 shields the insert 920 when assembled. However, the impact force applied to the impact energy absorbing apparatus 900 is applied from the inner cover 925 to the insert 920, with the outer cover 910 being deformed. The inner cover 925 may include a logo or label formed on an outer surface.

As mentioned above, the inner support 905 may be fabricated from a foam material. The outer cover 910 may be fabricated from a flexible material, such as rubber. The insert 920 and the inner cover 925 each may be fabricated from a stiff material, for example, polypropylene or another engineering plastic, although these materials and dimensions should be considered non-limiting examples only.

As mentioned above, in one embodiment, the inner support 905 may be mechanically coupled to a portion of the side of the child vehicle safety seat 100, for example, to the shell 110.

The side impact energy absorbing apparatus 900 may in some embodiments be reusable after absorbing impact energy. In other embodiments, the energy absorbing apparatus 900 should be replaced after being subjected to a sufficiently high impact force.

Having thus described several aspects of at least one embodiment of this disclosure, it is to be appreciated that various alterations, modifications, and improvements will readily occur to those skilled in the art. For example, although described herein as a side impact energy absorbing apparatus, embodiments of the apparatus 900 disclosed herein may also or alternatively be used to absorb impact energy from the front, rear, top, or bottom of an child conveyance device or any other object that one desires to protect from impact energy. Such alterations, modifications, and improvements are intended to be part of this disclosure, and are intended to be within the spirit and scope of the disclosure. Accordingly, the foregoing description and drawings are by way of example only.

What is claimed is:

1. A child conveyance device comprising:
   an impact energy absorbing apparatus disposed on a portion of the child conveyance device, the impact energy absorbing apparatus including:
      an inner support configured to be positioned against the portion of the child conveyance device, the inner support having a receptacle formed therein;
      an outer cover configured to releasably secure the inner support; and
      an insert received within the receptacle of the inner support, the insert being held in place by the outer cover when securing the outer cover, the insert having a wall with a closed end and an open end, the insert sized to fit within the receptacle of the inner support with the closed end first entering the receptacle.

2. The child conveyance device of claim 1, wherein the receptacle of the inner support has a shape complimentary to a shape of the insert.

3. The child conveyance device of claim 2, wherein the insert embodies a rectangular-shaped frustum.

4. The child conveyance device of claim 2, wherein the insert is configured to partially enter the receptacle of the inner support, with an internal volume being defined between internal surfaces of the inner support and outer surfaces of the insert.

5. The child conveyance device of claim 4, wherein when an impact force having an amplitude less than a threshold value is applied to the impact energy absorbing apparatus, the insert is configured to resist the impact force, and when the impact force having an amplitude greater than the threshold value is applied to the impact energy absorbing apparatus, the insert is configured to slide inwardly into the receptacle of the inner support to absorb the impact force, with the insert being configured to occupy the internal volume of the receptacle as the insert moves into the receptacle.

6. The child conveyance device of claim 5, wherein the insert is caused to plastically deform as the insert is moved within the receptacle.

7. The child conveyance device of claim 1, further comprising an inner cover configured to fit within an opening formed in the outer cover, the inner cover shielding the insert when assembled.

8. The child conveyance device of claim 1, wherein the child conveyance device is a child vehicle safety seat.

9. The child conveyance device of claim 8, wherein the inner support is secured to a shell of the safety seat by the outer cover.

10. The child conveyance device of claim 9, wherein the shell of the safety seat holds the outer periphery of the outer cover in place.

11. The child conveyance device of claim 8, wherein an impact force applied to the impact energy absorbing apparatus having an amplitude less than a threshold value causes the insert to resist the impact force.

12. The child conveyance device of claim 11, wherein an impact force applied to the impact energy absorbing apparatus having an amplitude greater than the threshold value causes the insert to slide inwardly into the receptacle of the inner support to plastically deform the insert.

13. The child conveyance device of claim 1, wherein the impact energy absorbing apparatus is replaceably secured to the portion of the child conveyance device.

14. The child conveyance device of claim 1, wherein the inner support is fabricated from foam material and the outer cover is fabricated from plastic material.

15. An impact energy absorbing apparatus disposed on a portion of a child conveyance device, the impact energy absorbing apparatus including:
   an inner support configured to be secured to the portion of the child conveyance device, the inner support having a receptacle formed therein;
   an outer cover configured to releasably secure the inner support; and
   an insert received within the receptacle of the inner support, the insert being held in place by the outer cover when securing the outer cover, the insert having a wall with a closed end and an open end, the insert sized to fit within the receptacle of the inner support with the closed end first entering the receptacle.

16. The impact energy absorbing apparatus of claim 15, wherein the receptacle of the inner support has a shape complimentary to a shape of the insert.

17. The impact energy absorbing apparatus of claim 16, wherein the insert embodies a rectangular-shaped frustum.

18. The impact energy absorbing apparatus of claim 16, wherein the insert is configured to partially enter the receptacle of the inner support, with an internal volume being defined between internal surfaces of the inner support and outer surfaces of the insert.

19. The impact energy absorbing apparatus of claim 18, wherein when an impact force having an amplitude less than a threshold value is applied to the impact energy absorbing apparatus, the insert is configured to resist the impact force, and when the impact force having an amplitude greater than the threshold value is applied to the impact energy absorbing apparatus, the insert is configured to slide inwardly into the receptacle of the inner support to absorb the impact force, with the insert being configured to occupy the internal volume of the receptacle as the insert moves into the receptacle.

20. The impact energy absorbing apparatus of claim 19, wherein the insert is caused to plastically deform as the insert is moved within the receptacle.

21. The impact energy absorbing apparatus of claim 15, further comprising an inner cover configured to fit within an opening formed in the outer cover, the inner cover shielding the insert when assembled.

22. The impact energy absorbing apparatus of claim 15, wherein the inner support is fabricated from foam material and the outer cover is fabricated from plastic material.

23. A child conveyance device comprising:
an impact energy absorbing apparatus disposed on a portion of the child conveyance device, the impact energy absorbing apparatus including:
an inner support fabricated from foam material and configured to be positioned against the portion of the child conveyance device, the inner support having a receptacle formed therein;
an outer cover fabricated from plastic material and configured to releasably secure the inner support; and
an insert received within the receptacle of the inner support, the insert being held in place by the outer cover when securing the outer cover.

24. An impact energy absorbing apparatus disposed on a portion of a child conveyance device, the impact energy absorbing apparatus including:
an inner support configured to be secured to the portion of the child conveyance device, the inner support having a receptacle formed therein; and
an insert received within the receptacle of the inner support, the insert having a wall with a closed end, the insert sized to fit within the receptacle of the inner support with the closed end first entering the receptacle.

* * * * *